(No Model.)
W. H. GORDON.
CHEESE OR LUNCH BOX.
No. 250,908.                    Patented Dec. 13, 1881.
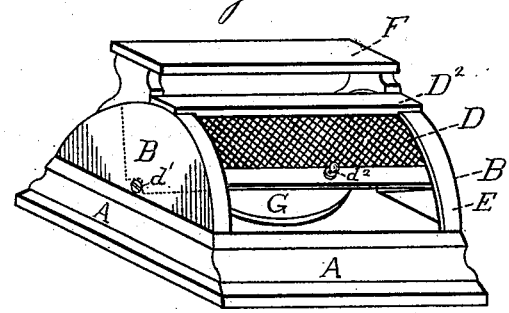
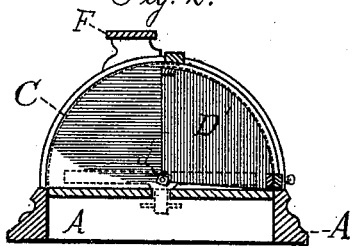
WITNESSES
Samuel E. Thomas
J. Edward Warren
INVENTOR
William H. Gordon
By W. W. Liggett,
ATTORNEY

UNITED STATES PATENT OFFICE.

WILLIAM H. GORDON, OF DETROIT, MICHIGAN.

CHEESE OR LUNCH BOX.

SPECIFICATION forming part of Letters Patent No. 250,903, dated December 13, 1881.

Application filed September 24, 1881. (No model.)

*To all whom it may concern:*

Be it known that I, WILLIAM H. GORDON, of Detroit, county of Wayne, State of Michigan, have invented a new and useful Improvement in Cheese and Lunch Safes; and I declare the following to be a full, clear, and exact description of the same, such as will enable others skilled in the art to which it pertains to make and use it, reference being had to the accompanying drawings, which form a part of this specification.

My invention consists of the combination of devices and appliances hereinafter specified, and more particularly pointed out in the claims.

In the drawings, Figure 1 is a perspective view of one of my cheese and lunch safes. Fig. 2 is a central section of the same from front to rear.

It is the object of my invention to provide a safe in which a cheese or lunch, &c., may be placed and exhibited, yet which shall be durable in construction, simple of operation, and cost but a small sum to make, and which has a door that will fall back by gravity when open, and thus hold itself open, yet when pulled forward will again close by gravity and remain closed, thus obviating the difficulty found in that class of safes which require to be fully opened by hand, and which, unless the operator is careful to entirely close it by hand, remains partially open to the passage of flies and other insects. I desire also to accomplish these results without permitting the door to open beyond the natural confines of the safe itself, so that the lid shall never be in the way.

To this end A is a suitable base, with semicircular uprights B at its edges.

C is wire cloth or netting, which permanently covers the rear half of the device.

D is a cover of similar material. Its ends are fastened to sector-shaped blocks D', which, in turn, are pivoted at $d'$ to the uprights of the case.

$D^2 D^2$ are cross-pieces, and $d^2$ is a handle by which the lid is operated. A flange, E, sets over the edges of the lid, so as to close the space and make a neat finish.

F is a shelf, located cross the top of the device for the reception of plates, &c. It also serves to hold the uprights apart, and prevents any external object from resting upon the wirecloth.

G is a revolving stand for the cheese or lunch.

The operation of the device is apparent. The blocks D' are so pivoted that when the lid is raised to a certain point the preponderance of the weight of the blocks and the lid is carried beyond the pivotal points $d'$, so that it then drops open by gravity and remains open, and when closing, as soon as the preponderance of the weight is transferred to the front of the pivotal points $d'$, the door drops shut and remains shut, and the whole movement of the door is within the confines of the safe.

What I claim is—

1. A cheese or lunch safe formed of a semicylindrical shell of wire cloth or netting, plane semicircular uprights, a door concentric with the cylinder, or nearly so, and pivoted by end blocks at or near the axis of the cylinder, substantially as described.

2. A cheese or lunch safe formed of a semicylindrical shell of wire cloth or netting, plane semicircular uprights, a door of wire cloth or netting fastened to end blocks, which latter are pivoted at or near the axis of the cylinder, a revolving table within, and with a platform across the top, substantially as described.

In testimony whereof I sign this specification in the presence of two witnesses.

WILLIAM H. GORDON.

Witnesses:
J. EDWARD WARREN,
SAMUEL E. THOMAS.